Patented Aug. 16, 1938

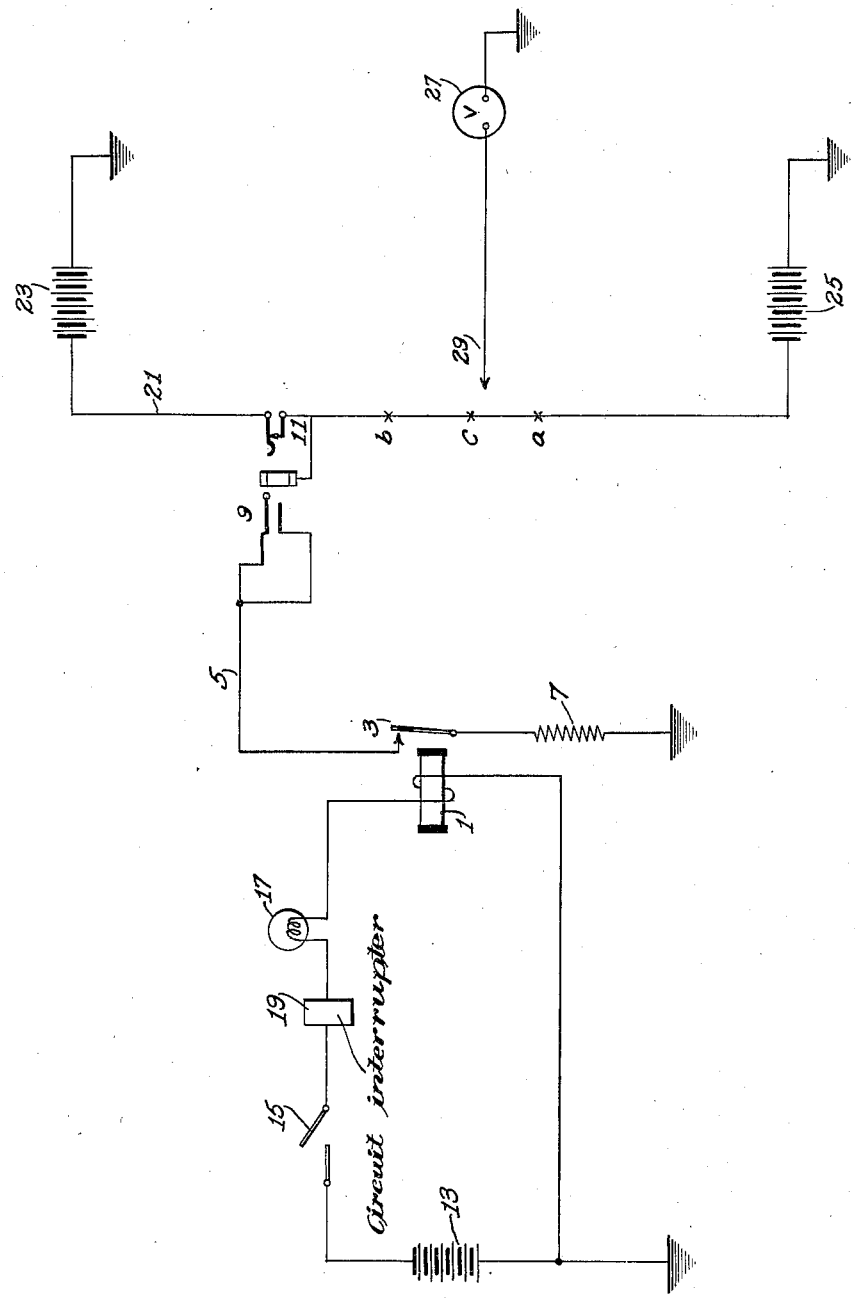

2,127,216

UNITED STATES PATENT OFFICE 2,127,216

METHOD AND MEANS FOR TESTING LINE CIRCUITS

Frederick G. Hallden, Bellerose, and Ronald S. Wishart, Rockville Centre, N. Y., assignors to Postal Telegraph-Cable Company (New York), New York, N. Y., a corporation of New York Application April 3, 1937, Serial No. 134,762

8 Claims. (Cl. 175—183)

Our invention relates to methods and means for testing line circuits for faults and is particularly adapted for testing call loop circuits when the same battery potential is supplied at each end of the loop.

In testing loop circuits, in which the same potential is supplied at both ends of the loop, a simple voltage measurement between a point in the line and ground will not indicate a break in the circuit, since the meter will at all times have the same reading.

To overcome the above difficulty a system has been suggested in which a steady tone is impressed upon one side of the loop for purposes of test. A receiver is used to pick up this tone along the line when testing. Such a tone frequency, however, particularly where the loops pass through the cable, can be heard on both sides of the loop, thereby defeating the purpose for which it was intended.

Another method provides for applying a tone on one side of a loop only when the same side of the loop is grounded. However, such a system will not operate properly in the event of a poor ground at the test point and its usefulness is thereby materially limited.

It is an object of our invention to provide a relatively simple method for testing loop circuits which is free from the above outlined disadvantages and will supply a positive indication of faults existing in the line.

It is a further object of our invention to provide an intermittently operating circuit which will apply to the line under test, pulses of a fixed potential, different from that ordinarily supplied to the line.

It is a further object of our invention to provide a method of testing for faults in the line which comprises intermittently grounding the line through a resistance, thus supplying a pulsating potential to the line, and observing on an indicating instrument this pulsating potential of the line to ground at a point therealong to determine any open circuits or grounded points in the line, and the direction of such faults from the point of test.

Other objects and uses of our invention will present themselves in connection with the more particular description of the particular embodiment of the invention described in connection with the accompanying drawing. The single figure in the drawing illustrates by way of example, a preferred embodiment of our invention.

Referring now to the drawing reference character 1 indicates a relay arranged, when operated, to close contact 3 connecting the cord 5 to ground, through a suitable connection which may include a resistance 7. This cord may be of any suitable type and may be provided with a plug 9 for suitable connection with a series jack 11 arranged in a line circuit to be tested.

One end of the winding of relay 1 is connected to a source of direct current supply which may be any desired source such as battery 13, the other end of the relay winding is connected to the opposite pole of battery 13 through a suitable intermittently operating interrupting means 19, lamp 17 and a suitable switch 15. The interrupting means may be any desired type and by way of example, is illustrated as an ordinary well known type of flasher button indicated as 19. This flasher button may be of the ordinary type which is readily fitted into the commercial light socket and operates to intermittently vary the circuit. It can be readily seen from the description of the circuit given above, that when switch 15 is closed flasher button 19 will operate to intermittently energize relay 1 at the frequency of the flasher button and accordingly ground conductor 5 at this same frequency. The lamp 17 will also flash in unison and indicate that the interrupter is operating.

In making a test of a loop circuit testing plug 9 may be inserted into series jack 11 at any suitable point in the line 21. Since this test device is particularly useful in loops which are provided with a D. C. potential at both ends, batteries 23 and 25 are shown connected in the call loop line 21. This connection then provides means for intermittently grounding line 21 for test purposes. Any desired means may be used to observe the voltage at points along the lines. As illustrated, a high resistance voltmeter 27, is used as the indicating instrument. A test clip 29 is connected to the meter to provide for connection to the line. The other side of voltmeter 27 is connected to ground.

While the circuit as described shows connection of various elements to ground, it is clear that they may be connected to a common metallic return circuit instead, without altering the principle of operation.

In making a test, plug 9 is inserted into jack 11 and switch 15 is closed so that the line is intermittently grounded by the operation of relay 1. Suppose first, that a break exists in the line at a point such as indicated at $a$. Upon bringing the test clip into contact with the line the voltmeter will show pulsating indications in timed relation with the operation of relay 1 due to the change in potential on the line, if the test is made at a point between the break a and jack 11. Thus, such a pulsation will clearly indicate to the test operator that no break exists in the line on the side toward jack 11.

On the other hand, if test clip 29 makes contact with line 21 at a point which is on the other side of break a between that point and battery 25, the meter will show a steady deflection due solely to the potential of the battery 25. It is therefore clear that the testing operator may readily locate breaks in the call loop circuit by testing points along the line and noting whether the meter deflections are steady or pulsating.

Suppose, on the other hand, that instead of an open circuit the fault in the line comprises a ground at some point such as b. It will then be evident that since the point b is at ground potential the voltage at this point will read zero and the pulsation due to the intermittent grounding through contact 3 will have no effect upon the reading of meter 27. Likewise it will be evident that the voltage reading at points between b and battery 25 will decrease as the grounded point is approached and will not pulsate. It is likewise evident that the same effect would be noted in approaching point b from the side connected to battery 23. However, in this case pulsations will be noted.

In order to more readily locate a grounded point b it is desirable to open line 21 at some point. Suppose line 21 is opened at a point c, the test meter will then show a steady potential if connected on the side toward battery 25. If, on the other hand, the test clip is connected on the side toward the ground b the meter 27 will show zero deflection due to the ground applied at point b, thus indicating that ground is in this direction. It is thus clear that by testing at several points along the line the point at which the line is grounded may be readily discovered. Similar results will be obtained if the line is opened between the ground b and jack 11, except that the meter readings will be pulsating.

It can readily be seen from the description of the invention in connection with the drawing as fully set forth above, that we have provided a very simple test circuit which is very reliable and which is readily adapted for making tests in call line circuits. It is apparent that this type of test circuit may be applied to the testing of any desired type of line, even if potential is not applied to both ends, and is very useful in this field since the pulsating voltage produces a very definite indication which is readily apparent and can be easily interpreted by the operator making the test.

While the invention has been described in connection with the particular example shown in the drawing, we do not intend this description to define the scope of the invention but contemplate any of the modifications thereof within the terms of the appended claims.

What is claimed is:

1. In a tester for call circuits, a call line supplied with a fixed potential, means connected to said call line for intermittently grounding said line to produce voltage impulses therein, and means for connection to said line for observing said voltage impulses to indicate a fault in said line.

2. In a testing arrangement for call line circuits, means for impressing test signals on said line, comprising a source of potential, a relay connected across said source, means in series with said source and said relay for intermittently interrupting the current through said relay, a line plug for insertion into said line to be tested, and means operative intermittently under control of said relay for applying ground potential to said line plug.

3. A line testing means for line circuits, in which both ends of the line are batteried, comprising means for intermittently applying a fixed potential to said line, and means for measuring the potential along said line to indicate faults therein.

4. The method of testing a call line circuit for faults, comprising the steps of intermittently applying a ground potential to said line, and measuring the voltage to ground along said line during said intermittent application.

5. Means for testing a line circuit, both ends of which are supplied with a fixed potential, comprising means for intermittently grounding said line through a resistance, and means for measuring the potential between said line and ground at points along said line.

6. Means for testing a line circuit, both ends of which are supplied with a direct current potential, means for intermittently connecting a point on said line to a source of a different fixed potential and means for measuring the potential along said line to determine faults therein.

7. The method of testing a line circuit, both ends of which are supplied with a direct potential, comprising the step of intermittently supplying a different fixed potential to said line, and measuring the potential at points along said line while supplying said intermittent potential.

8. In an arrangement for testing a line for faults, means for impressing test signals on said line comprising a source of direct current, a relay energized from said source, a lamp supplied with a means for interrupting said lamp circuit in series with said source and said relay, and a switch controlled by said relay for intermittently connecting a test cord to a source of fixed potential.

FREDERICK G. HALLDEN.
RONALD S. WISHART.